(12) United States Patent
Nouri et al.

(10) Patent No.: US 10,590,352 B2
(45) Date of Patent: Mar. 17, 2020

(54) ABNORMAL TEMPERATURE DETECTION FOR FIXED BED REACTORS

(71) Applicant: ExxonMobil Research and Engineering Company, Annandale, NJ (US)

(72) Inventors: Dana W. Nouri, Beaumont, TX (US); Hans G. Korsten, Naples, FL (US); Benjamin S. Umansky, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 195 days.

(21) Appl. No.: 15/434,408

(22) Filed: Feb. 16, 2017

(65) Prior Publication Data

US 2017/0253815 A1    Sep. 7, 2017

Related U.S. Application Data

(60) Provisional application No. 62/303,038, filed on Mar. 3, 2016.

(51) Int. Cl.
| | |
|---|---|
| *C10G 47/36* | (2006.01) |
| *C10G 47/02* | (2006.01) |
| *B01J 8/02* | (2006.01) |

(52) U.S. Cl.
CPC ............ *C10G 47/36* (2013.01); *B01J 8/0285* (2013.01); *C10G 47/02* (2013.01);
(Continued)

(58) Field of Classification Search
CPC ............... C10G 47/36; C10G 47/02; C10G 2300/4006; B01J 8/0285; B01J 2208/025; B01J 2208/00061
See application file for complete search history.

(56) References Cited

U.S. PATENT DOCUMENTS

| | | |
|---|---|---|
| 3,974,065 A | 8/1976 | Powell et al. |
| 4,384,793 A | 5/1983 | O'Brien |

(Continued)

FOREIGN PATENT DOCUMENTS

| | | |
|---|---|---|
| DE | 19818693 A1 | 6/1999 |
| KR | 20110107763 A | 10/2011 |

OTHER PUBLICATIONS

Harris et al (Optimal Sensor Loacation with an Application to a Packed Bed Tubular Reactor, 1980, AIChe journal vol. 26 No. 6 p. 910-916) (Year: 1980).*

(Continued)

*Primary Examiner* — Randy Boyer
*Assistant Examiner* — Juan C Valencia
(74) *Attorney, Agent, or Firm* — Priya G. Prasad; Ryan L. Lobato (57) ABSTRACT

Systems and methods are provided for detecting abnormal temperature conditions within a fixed bed reactor. In a fixed bed reactor, a hydrocarbon (or hydrocarbon-like) feedstock can be exposed to one or more types of catalyst particles at elevated temperatures and/or pressures. In addition to the one or more types of catalyst particles, a plurality of temperature-sensor structures can be included in a catalyst bed and/or a coating including one or more temperature-sensor structures can be provided on an interior wall or other interior surface in the reactor. The temperature-sensor structures can have a threshold temperature at which the temperature-sensor structure changes to allow introduction and/or release of a detectable substance.

9 Claims, 3 Drawing Sheets

(52) U.S. Cl.
CPC ............ *B01J 2208/00061* (2013.01); *B01J 2208/025* (2013.01); *C10G 2300/4006* (2013.01)

(56) References Cited

U.S. PATENT DOCUMENTS

| | | | |
|---|---|---|---|
| 2005/0249992 A1* | 11/2005 | Bitoh | ............ B01B 1/005 429/423 |
| 2009/0326289 A1 | 12/2009 | Petri et al. | |
| 2011/0166367 A1 | 7/2011 | Gross et al. | |
| 2014/0294041 A1 | 10/2014 | Zhang et al. | |
| 2018/0080833 A1* | 3/2018 | Cahan | ............ G01K 7/24 |

OTHER PUBLICATIONS

Harris et al., "Optimal Sensor Location with an Application to a Packed Bed Tubular Reactor", AIChE Journal, Jun. 17, 1980, pp. 910-916, vol. 26, iss. 6, Wiley Online Library.

The International Search Report and Written Opinion of PCT/US2017/018263 dated Jul. 5, 2017.

Wang et al., "Infrared thermal detector array using Eu(TTA)-based temperature sensitive paint for optical readable thermal imaging device", J. Micromech. Microeng. 25 (2015) 035012 pp. 1-8.

Wei et al., "Strontium cobaltite coated optical sensors for high temperature carbon dioxide detection", Sensors and Actuators B 144 (2010) pp. 260-266.

Someya et al., "Combined two-dimensional velocity and temperature measurements of natural convection using a high-speed camera and temperature-sensitive particles", Experiments in Fluids 50 (2011) pp. 65-73.

* cited by examiner

ABNORMAL TEMPERATURE DETECTION FOR FIXED BED REACTORS

CROSS-REFERENCE TO RELATED APPLICATIONS

This application claims the benefit of U.S. Provisional Application No. 62/303,038, filed on Mar. 3, 2016, the entire contents of which are incorporated herein by reference.

FIELD

This invention is directed to systems and methods for detection of temperature changes within a fixed bed reaction system.

BACKGROUND

A variety of reactions related to chemical and/or petroleum processing can be beneficially performed by exposing a feedstock to one or more fixed beds of catalyst within a reactor. Hydroprocessing is an example of such a process. Depending on the nature of the feed and the desired product, hydroprocessing can be used to remove contaminants such as sulfur and/or nitrogen; modify the boiling range of a feed to form higher value products; modify the properties of a feed, such as cold flow properties or viscosity properties; and/or saturate olefins and aromatics in the feed. Other examples of chemical and/or petroleum processing processes can include, but are not limited to, alkylation processes and oligomerization processes.

One potential difficulty with exposing a feedstock to one or more beds of catalyst in a reactor is that many types of reactions are exothermic. If a problem develops with flow within a catalyst bed, localized heating can occur that can allow a portion of a catalyst bed to reach an undesirable temperature, even though the overall reaction temperature may be within a tolerance limit. This type of temperature excursion can cause a variety of difficulties, such as deactivation of catalyst and production of undesired side products. Additionally, if sufficient excessive heating occurs, the excessive heating can potentially damage the internal structure of the reactor, or even lead to vessel failure.

German patent publication no. DE 19818693 describes a method for detecting temperature changes in a reactor. Long tubes containing a substance under pressure are located on the interior of the reactor. As the temperature increases, the pressure changes in the tubes can be detected. In some aspects, if a sufficient pressure is built up within a tube, the substance within a tube can cause the tube to rupture, leading to release of the pressure within the tube. Nitrogen is provided as an example of a substance to use within the tubes in the aspect where a tube may break open due to increased pressure.

SUMMARY

In an aspect, a fixed bed processing system is provided. The fixed bed processing system can include a reactor vessel having a reactor inlet and a reactor outlet. The reactor vessel can further include at least one fixed bed of catalyst particles within the reactor vessel. One or more temperature-sensor structures can also be included within the reactor vessel. Examples of temperature-sensor structures can include, but are not limited to, temperature-sensor particles and coatings that comprise a temperature-sensor structure. A detector can be in fluid communication with the reactor outlet. The detector can optionally correspond to a spectroscopic detector, a radiation detector, a chromatographic detector, or a combination thereof. Optionally, the one or more temperature-sensor structures can be composed of a material that undergoes a structural change at a threshold temperature. The one or more temperature-sensor structures can have a first rate of introducing a detectable substance into the reactor at a temperature below the threshold temperature and a second rate of introducing the detectable substance at a temperature above the threshold temperature, the second introduction rate optionally being at least 5 times the first introduction rate.

In another aspect, a method for processing a feed in a fixed bed reactor is provided. The method can include exposing a hydrocarbon-like feed to a catalyst in a fixed catalyst bed in a reactor under fixed bed processing conditions to form a reactor effluent. The fixed bed processing conditions can include an average catalyst bed temperature for the fixed catalyst bed. The reactor can include one or more temperature-sensor structures, the one or more temperature-sensor structures having a threshold temperature. A detectable substance can be detected in the reactor effluent. The detectable substance can be introduced into the reactor effluent by at least one of the one or more temperature-sensor structures. When the detectable substance is not detectable prior to exposing a temperature-sensor structure to a threshold temperature, the amount of detectable substance in the reactor effluent can be greater than the detection limit for the detectable substance. Optionally, at least a portion of the detectable substance can be present in the reactor effluent separate from introduction by the one or more temperature-sensor structures. When the detectable substance is detectable prior to exposing a temperature-sensor structure to a threshold temperature, the amount of detectable substance detected in the reactor effluent can be at least about 1% greater than an average amount detected in the reactor effluent at the average catalyst bed temperature.

DETAILED DESCRIPTION OF THE PREFERRED EMBODIMENTS

Overview

In various aspects, systems and methods are provided for detecting abnormal temperature conditions within a fixed bed reactor. In a fixed bed reactor, a hydrocarbon (or hydrocarbon-like) feedstock can be exposed to one or more types of catalyst particles at fixed bed processing conditions including elevated temperatures and/or pressures. In addition to the one or more types of catalyst particles, a plurality of temperature-sensor particles (or other temperature-sensor structure) can be included in a catalyst bed. Alternatively, a coating including a temperature-sensor structure can be provided on an interior wall or other interior surface in the reactor. The temperature-sensor particles (or other temperature-sensor structure) can have a threshold temperature at which the structure of the particle changes to allow introduction and/or release of a detectable substance. Any convenient type of structural change can be used, such as rupture of the particle shell, melting of the particle, and/or opening due to differences in thermal expansion rates of the particle materials. After the structural change, the temperature-sensor particle can introduce a detectable substance into the feedstock as it is processed in the catalyst bed. The detectable substance can be directly introduced into the feedstock, such as by releasing a dye or radioisotope into the feedstock. Alternatively, the detectable substance can be indirectly introduced. An example of indirectly introducing a substance into the feedstock can be releasing a reagent into the feedstock for subsequent formation of a detectable compound (such as by decomposition). Another example can be a structural change that exposes a catalyst to the feed/effluent in the reactor that can catalyze formation of a detectable compound within the reaction effluent. The substance, whether directly or indirectly introduced, can be suitable for detection in-line or otherwise in real time from an effluent of the reactor that contains the catalyst bed.

Many types of reactions performed using a fixed catalyst bed can correspond to exothermic reactions performed at a desired temperature or within a temperature window. Unfortunately, the flow pattern within a catalyst bed can become non-uniform for a variety of reasons. When a non-uniform (or otherwise non-ideal) flow pattern occurs, localized heating may concomitantly occur within portions of a catalyst bed to a greater degree than desired. This localized heating can lead to substantial increases in temperature beyond the expected and/or target operating temperature for the catalyst bed, particularly for highly exothermic reactions.

An unexpected and/or abnormal temperature can cause a variety of problems within a reactor. For some catalysts, operating at increased temperatures can activate alternative reaction pathways, potentially leading to undesired products, catalyst damage, and/or even a runaway reaction. Increased temperatures can additionally or alternatively potentially damage equipment within a reactor and/or lead to vessel failure.

Another difficulty with non-uniform flow patterns is that such flow patterns can be difficult to detect. Conventionally, the temperature within a reactor can be monitored using a large plurality of thermocouples. For example, a reactor with a diameter of about 5 meters and including 3 catalyst beds can include hundreds of thermocouples located at various heights and radial locations in the reactor. In order to position thermocouples at the large number of locations where localized heating might occur, a reactor can include concentric rings at a plurality of elevations to provide a support structure for mounting thermocouples. Another option can be to have a plurality of vertical thermowells that can house thermocouples at various elevations within a reactor. Both the number of thermocouples and the presence of the thermowells/other support structures for housing the thermocouples can pose difficulties. This can include problems during loading/unloading the catalyst bed due to the presence of the thermowells; changes introduced into the flow pattern within catalyst bed(s) due to the presence of the thermocouples and/or thermowells; and/or issues related to new flow paths (i.e., leaks) between various reactor internals due the presence of the thermocouples and/or thermowells. Additionally or alternatively, the thermocouples/thermowells can tend to be fixed in location once a reactor is constructed, with limited or possibly no ability to adjust the location of thermocouples based on the reaction being performed in a reactor.

Temperature-sensor particles (and/or other temperature-sensor structures) can provide a more flexible solution for detection of abnormal temperature events in a reactor. During loading of a catalyst bed, temperature-sensor particles can be added in any convenient manner. This can include distribution at specific locations, random distribution throughout a bed, distribution in a pattern throughout a catalyst bed, or combinations thereof. Because the temperature-sensor particles can be part of the catalyst bed, the location of the temperature-sensor particles can be modified with each catalyst load change. Use of temperature-sensor particles can additionally or alternatively simplify detection of temperature changes. Rather than having to separately connect a large plurality of thermocouples to one or more detectors, the temperature-sensor particles can release a substance that can be directly or indirectly detected in the effluent from a catalyst bed and/or a reactor. This can allow one detector or a small plurality of detectors located at one or more convenient locations in an effluent flow path to be used for detection of an abnormal temperature event.

In addition to or as an alternative to use of temperature-sensor particles, temperature-sensor coatings can be used within a reactor. This can correspond to having a coating including embedded temperature-sensor particles. Another option can be to have an internal coating of a material suitable for forming a temperature-sensor structure, so that the coating itself can undergo a structural change when an abnormal temperature event occurs. Temperature-sensor particles and temperature-sensor coatings can more generally be referred to as temperature-sensor structures.

An example of a reaction system where methods for detection of abnormal temperature events can be useful includes a reactor/reaction system containing at least one fixed bed of an acidic catalyst, basic catalyst, and/or a catalyst containing a molecular sieve. Catalysts including at least one molecular sieve and/or acidic/basic catalysts can be used to facilitate a variety of reactions. Many types of processes can involve processing of petroleum feeds, renewable feeds, refinery streams, chemical production feeds, and/or other hydrocarbon-like feeds in the presence of one or more fixed catalyst beds. In such processes, the target process conditions can include a temperature that reduces and/or minimizes the catalysis of undesirable reaction pathways.

One example of an undesirable reaction pathway can be cracking of hydrocarbons. Many acidic catalysts and/or catalysts containing molecular sieves can have substantial cracking activity at higher temperatures. At lower temperatures, this cracking activity can be controlled, reduced, and/or minimized, so that desired products can be selectively formed. However, due to the exothermic nature of most cracking reactions, if the temperature becomes high enough, the rate of cracking may be able to generate sufficient additional heat generated to result in a self-reinforcing cycle of increasing cracking and further increasing temperature. When this occurs due to a localized "hot spot" in a catalyst bed, it can be difficult to detect the onset of this type of self-reinforcing condition unless the "hot spot" happens to be near the edge of the reactor where a conventional thermocouple can be located. The ability to distribute temperature-sensor particles throughout a catalyst bed can facilitate early detection of this type of event, so that a corrective action can be taken while reducing and/or minimizing (i) potential damage to the catalyst bed and/or (ii) the amount of product yield loss due to unexpected processing conditions.

Temperature-Sensor Structure—Definitions

In order to clarify the description of the invention, the following definitions are provided. The following definitions should be applied throughout the description herein unless otherwise specified.

A temperature-sensor structure is defined herein as a structure (such as a particle, a coating, or a combination thereof) exhibiting a structural change at a threshold temperature to allow for increased introduction of a detectable substance into a feed or effluent flow within a reactor. The threshold temperature corresponds to a temperature at the typical and/or expected operating pressure of the reactor/reaction system where the temperature-sensor structure is being used. The threshold temperature can be a high temperature threshold or a low temperature threshold. For a temperature-sensor structure with a high temperature threshold, the structure can exhibit a structural change at temperatures above the threshold temperature, while a structure with a low temperature threshold can exhibit a structural change at temperatures below the threshold temperature. In an aspect, a temperature-sensor structure (such as a temperature-sensor particle or temperature-sensor coating) is defined to be different from any thermocouples which may optionally be present in a reactor/reaction system.

One option for characterizing the amount of a detectable substance can be based on the rate of introduction of the detectable substance into the feed or effluent within the reactor. When a temperature-sensor structure is exposed to a temperature exceeding (either high or low) the threshold temperature, a structural change can occur in the structure resulting in an increased rate of introduction of a detectable substance into a reactor effluent. The increased rate of introduction can be characterized based on a) a rate of introduction per second prior to exposure to a temperature beyond the threshold temperature and b) a rate of introduction per second for at least one time period during and/or after the exposure to the temperature beyond the threshold temperature. The increased rate of introduction can correspond to a rate of introduction (per second) of the detectable substance after the exposure to the abnormal temperature of at least 5 times greater than the average rate of introduction (per second) prior to the abnormal temperature exposure. For example, the rate of introduction after the exposure to the abnormal temperature exposure can be at least about 5 times greater than the average rate of introduction prior to the abnormal temperature exposure, for example at least about 10 times, at least about 25 times, at least about 100 times, or at least about 1000 times, such as up to about $10^{10}$ times greater or more. The average rate of introduction prior to the abnormal temperature can be determined based on a convenient time scale. If there is ambiguity, the average rate of introduction prior to the abnormal temperature exposure can be determined for the hour prior to the abnormal temperature exposure. If for some reason an hour is not practical, based on the measurement technique, the average rate of introduction can be determined for the minute prior. As an example, a temperature-sensor particle may introduce about 0.1 µg/sec (or less) of a dye into an effluent before exposure to a temperature above a high temperature threshold. After exposure to a temperature above a high temperature threshold, the temperature-sensor particle can release substantially all of the dye within the particle into the effluent, e.g., resulting in release of about 1 mg of dye into the effluent. If the dye release is substantially complete within 1 second, this would correspond to a release rate of about 1 mg/sec, or about 1000 µg/sec, which corresponds to a rate of introduction of the dye into the effluent after the abnormal temperature exposure that is a factor of about $10^4$ greater than the average rate of introduction of dye prior to the abnormal temperature exposure. For the limiting situation of an effluent that does not have a detectable level of a substance prior to the increase caused by a temperature-sensor material, an increase from a non-detectable level to a detectable level is defined herein as corresponding to the larger of a) a rate of introduction that is at least about 10 times greater, or b) an increase in the rate of introduction by a factor determined based on the difference between the detection limit for the substance and the actual detected level in the effluent.

Additionally or alternatively to characterizing the rate of introduction, for a substance not detectable prior to exposing a temperature-sensor structure to a threshold temperature (i.e., an abnormal temperature event), the amount of detectable substance in the effluent after an abnormal temperature event can be greater than the detection limit. In some aspects, the amount of detectable substance in the effluent after an abnormal temperature event can be at least about 10 times greater than the average amount prior to the abnormal temperature exposure, for example at least about 10 times, at least about 25 times, at least about 100 times, or at least about 1000 times, such as up to about $10^{10}$ times greater or more. In this discussion, a change from having an amount of a detectable substance in an effluent below the detection limit to having an amount greater than the detection limit is defined herein as a change in amount of detectable substance after an abnormal temperature event of at least 10 times greater than the amount prior to the abnormal temperature event.

It is noted that, in some aspects, the increase in the rate of introduction of a detectable substance into an effluent may correspond to an increase for only a brief period of time after exposure to an abnormal temperature. For example, for a temperature-sensor particle that contains a dye as a detectable substance, substantially all of the dye in the temperature sensor particle may be introduced into the effluent during a single (e.g., one second) time period after a structural change occurs for the temperature-sensor particle. In other aspects, the rate of introduction of the detectable substance may increase throughout the time of exposure of a temperature-sensor structure to an abnormal temperature, but then can return to a lower rate of introduction when the temperature no longer exceeds the threshold temperature. In still other aspects, the rate of introduction of the detectable substance may be maintained even after the temperature-sensor material is returned to a temperature below the high temperature threshold (or alternatively above a low temperature threshold). This may occur, for example, when the change in the temperature-sensor structure results in exposing a catalyst to the feed within the reactor.

Additionally or alternately, the detectable substance can be detected in an effluent exiting from the reactor containing a fixed bed. When detecting the detectable substance in the reactor effluent, a suitable concentration of the detectable substance in the reactor effluent can be an amount on the order of parts per billion by weight to parts per million by weight. In such aspects, the concentration of a detectable substance (after an abnormal temperature event) in a reactor effluent, an effluent from a fixed bed, or a combination thereof can be about 1 part per billion by weight to about 1000 parts per million weight at the location where the effluent (or a side stream derived from the effluent) passes through the detector and/or at the location where the effluent is sampled for use in the detector. For example, the concentration of a detectable substance in an effluent when detecting an abnormal temperature event can be (by weight) about 1 ppb to about 1000 ppm, for example about 1 ppb to about 100 ppm, about 1 ppb to about 10 ppm, about 1 ppb to about 1 ppm, or about 1 ppb to about 100 ppb, about 10 ppb to about 1000 ppm, about 10 ppb to about 100 ppm, about 10 ppb to about 10 ppm, about 10 ppb to about 1 ppm, about 10 ppb to about 100 ppb, about 100 ppb to about 1000 ppm, about 100 ppb to about 100 ppm, about 100 ppb to about 10 ppm, about 100 ppb to about 1 ppm, about 1 ppm to about 1000 ppm, about 1 ppm to about 100 ppm, about 1 ppm to about 10 ppm, about 10 ppm to about 1000 ppm, or about 10 ppm to about 100 ppm. The concentration in the reactor effluent of the detectable substance after the abnormal temperature event may only achieve the above concentration ranges for a limited period of time, such as for a minute or less, or a few seconds or less, or even a second or less. It is noted that the concentration of detectable substance may vary widely at other locations in a reactor after an abnormal temperature event.

Optionally, the detectable substance can be a substance already present in the feed and/or effluent of the reactor. In such optional aspects, the amount of increase in the concentration of the detectable substance in an effluent (such as the effluent exiting a reactor) can be further characterized. In some optional aspects, the concentration of the detectable substance after exposure of a temperature-sensor structure to an abnormal temperature can be at least about 1% greater than the average concentration prior to the abnormal temperature exposure, as calculated relative to the average concentration, for example at least about 2% greater, at least about 5% greater, at least about 10% greater, at least about 50% greater, or at least about 100% greater, an optionally up to about 1000% greater, up to about 500% greater, up to about 100% greater, up to about 50% greater, or up to about 10% greater. In certain optional aspects, the substance already present in the feed and/or effluent may be present in a minor amount (e.g., in parts per billion or lower parts per million), so that the concentration of the detectable substance after an abnormal temperature event can be still higher, such as up to about 1000% greater or more, relative to the average concentration prior to the abnormal temperature.

In this description, introduction of a directly detectable substance into an effluent by a temperature-sensor structure is defined as introduction by the temperature-sensor structure of a substance detected without further reaction in the reactor. For example, a temperature-sensor particle/coating may contain a dye that can be detected by a suitable spectroscopic technique in the reactor effluent. Such a dye can be a directly detectable substance. Another example of a directly detectable substance can be a temperature-sensor particle/coating releasing a radioisotope, such as based on cobalt-60. Additional or alternative options can be a temperature-sensor particle/coating that can melt into the reactor effluent, so that a component of the particle/coating material itself can correspond to the detectable substance.

In this description, indirect introduction of an detectable substance into an effluent by a temperature-sensor structure is defined as release by the temperature-sensor structure of a substance (or exposure of a substance) that can undergo further reaction in the reactor, that can catalyze (or otherwise facilitate) a reaction within the reactor, or a combination thereof. One example of indirect introduction of a detectable substance can include a temperature-sensor structure that can release a reagent into a reaction effluent. The reagent can decompose under the reactor conditions, interact with catalyst in a catalyst bed in the reactor, react with a component of the feed being processed, and/or undergo any other convenient reaction to form a detectable substance. Because the reagent is not directly detected but instead used to form the detectable substance, the increased rate of release of the reagent is defined as indirect introduction of a detectable substance. As another example, the structural change for a temperature-sensor structure can result in exposure and/or release of an additional type of catalyst into the reaction environment. The additional type of catalyst can catalyze (or otherwise facilitate) formation of reaction product not otherwise present in a substantial amount in the reaction effluent. Thus, in this type of catalyst example, the detectable substance is not released from the temperature-sensor structure. Instead, the indirect introduction of the detectable substance can correspond to making an additional catalyst available, which can then catalyze and/or otherwise result in formation of the detectable substance.

The threshold temperature for a temperature-sensor structure can be any convenient temperature. In various aspects, a temperature-sensor structure can have a threshold temperature in any of the following ranges: about 500° C. to about 600° C., about 500° C. to about 550° C., about 550° C. to about 600° C., about 400° C. to about 500° C., about 400° C. to about 450° C., about 450° C. to about 500° C., about 300° C. to about 400° C., about 300° C. to about 350° C., about 350° C. to about 400° C., about 200° C. to about 300° C., about 200° C. to about 250° C., about 250° C. to about 300° C., about 600° C. to about 700° C., about 600° C. to about 650° C., or about 650° C. to about 700° C. More generally, the range for a threshold temperature can be about 200° C. to about 700° C., for example about 200° C. to about 500° C., about 300° C. to about 600° C., about 400° C. to about 700° C., about 200° C. to about 400° C., about 300° C. to about 500° C., about 400° C. to about 600° C., or about 500° C. to about 700° C.

In this discussion, the temperature of a reaction in a catalyst bed can be defined based on the average of the temperature at the top of the catalyst bed and the bottom of the catalyst bed. The top and bottom of the catalyst bed are with reference to the direction of flow within the catalyst bed.

Types of Temperature-Sensor Structures

Examples of temperature-sensor materials can include particles and/or coatings. Temperature-sensor particles can correspond to particles having any convenient size and/or shape suitable for incorporation into a catalyst bed. For example, many types of catalyst particles can range from about 1 mm to about 6 mm in diameter, most commonly in the range of about 1.3 mm to about 3 mm. In some aspects, the diameter of the temperature-sensor particle can be about 0.25 times to about 4.0 times the diameter of the catalyst particles of the bed in which the capsules are intended to be loaded, for example about 0.25 times to 3.0 times the diameter, about 0.25 times to about 2.0 times, about 0.25 times to about 1.0 times, about 0.5 times to about 4.0 times, about 0.5 times to about 3.0 times, about 0.5 times to about 2.0 time, about 0.5 times to about 1.0 times, about 1.0 times to about 4.0 times, about 1.0 times to about 3.0 times, about 1.0 times to about 2.0 times, or about 2.0 times to about 4.0 times. It is noted that a temperature-sensor particle smaller than about 20% of the catalyst diameter of the catalyst particles in a bed may be susceptible to being washed away during processing of a feed. Additionally or alternately, a temperature-sensor particle can have a diameter of about 0.1 mm to about 25 mm, for example about 0.1 mm to about 10 mm, about 0.1 mm to about 6.0 mm, about 0.1 mm to about 3.0 mm, about 0.1 mm to about 2.0 mm, about 0.1 mm to about 1.0 mm, about 0.3 mm to about 25 mm, about 0.3 mm to about 10 mm, about 0.3 mm to about 6.0 mm, about 0.3 mm to about 3.0 mm, about 0.3 mm to about 2.0 mm, about 0.3 mm to about 1.0 mm, about 0.5 mm to about 25 mm, about 0.5 mm to about 10 mm, about 0.5 mm to about 6.0 mm, about 0.5 mm to about 3.0 mm, about 0.5 mm to about 2.0 mm, about 0.5 mm to about 1.0 mm, about 1.0 mm to about 25 mm, about 1.0 mm to about 10 mm, about 1.0 mm to about 6.0 mm, or about 1.0 mm to about 3.0 mm.

Some shapes can correspond to 3-dimension solid shapes suitable for acting as containers for another substance, such as a spherical particle, cylindrical or rod-like particle, ovoid particle, or any other convenient shape. Other suitable shapes can correspond to any convenient shape that can be conventionally used as a shape for a catalyst particle, including shapes formed by extrusion methods. Common suitable catalyst shapes for a temperature-sensor particle can include, but are not necessarily limited to, sphere, cylinder, trilobe, and quadrulobe. One option for forming a temperature-sensor coating can be to form a coating including temperature-sensor particles in the coating. Additionally or alternately, the coating itself can correspond to a temperature-sensor material.

In some aspects, a temperature-sensor structure can correspond to a container that holds another substance. A structural change in the temperature-sensor structure can then introduce and/or expose the substance originally contained within the temperature-sensor material to the reaction environment. Additionally or alternately, a structural change in a temperature-sensor structure can cause the temperature-sensor structure to melt or otherwise be introduced into the effluent in the reaction environment, so that the temperature-sensor structure directly or indirectly becomes the detectable substance.

An example of a temperature-sensor structure is a temperature-sensor particle that contains another substance that can be introduced and/or exposed to the reaction environment in a reactor. The substance in the temperature-sensor particle can be a fluid under the conditions in the reaction environment and/or can be soluble in the fluid flow passing through the reaction environment. Optionally, for a substance corresponding to a catalyst, the catalyst can a) become part of the fluid flow in the reactor (such as a liquid catalyst and/or a catalyst with a particle size substantially smaller than other catalyst particles in the catalyst bed); b) be introduced into and become part of the catalyst bed; and/or c) be retained in the temperature-sensor particle.

One option for a temperature-sensor particle can be a particle composed of a material having a melting point in a desired temperature range. In this type of aspect, as the temperature approaches the melting point of the material used to form the temperature-sensor particle, the particle can undergo a structural change (such as melting and/or flow) allowing a substance within the particle to be released into the reaction environment. In this type of aspect, the threshold temperature of the temperature-sensor particle may not necessarily correspond exactly to the melting temperature of the particle material, as simply approaching the melting temperature may cause sufficient structural change to allow release of a substance contained within a particle.

A wide variety of metals and alloys are known that have melting points within different temperature ranges. A temperature-sensor particle can be composed of any convenient metal, metal alloy, and/or other metal-based compound a) having an appropriate threshold temperature for a given application and b) not otherwise reacting with the reaction environment in a manner that can lead to release of the substance within the temperature-sensor particle at temperatures below the threshold temperature. For example, many hydroprocessing environments can include a combination of $H_2S$, $CO_2$, $NH_3$, and/or water at elevated temperature and pressure. The temperature-sensor particle can be selected to not degrade under the selected hydroprocessing environment conditions. One of skill in the art can use chemical equilibrium calculations based on thermochemical properties when selecting a suitable material for a temperature-sensor particle.

Table 1 shows examples of various metals and alloys suitable for forming temperature-sensor particles (and/or other temperature-sensor structures), depending the specific reaction conditions within a fixed-bed processing environment.

TABLE 1

Metal and Alloy Melting Points

| Melting Points | deg C. | deg F. |
| --- | --- | --- |
| Aluminum alloys | ~463-~671 | ~865-~1240 |
| Babbitt | ~249 | ~480 |
| Lead | ~328 | ~621 |
| Magnesium alloys | ~349-~649 | ~660-~1200 |
| Tin | ~232 | ~449 |
| Zinc | ~420 | ~787 |

Another option for forming a temperature-sensor particle can be to form a particle containing a condensed phase substance that converts to a gas as the temperature increases. Based on the quantity of the substance inside the particle, the particle can be designed to undergo a structural change when the pressure inside the particle is sufficient to rupture/burst the particle.

Still another option can be to form the particle from two or more different materials, such as two different metals and/or alloys. The different materials can be selected to have different thermal expansion properties so the differing thermal expansion properties cause the particle to open when a threshold temperature is achieved.

The content of the temperature-sensor particles can vary depending on the desired type of detectable substance. Examples of directly detectable substances can include various types of dyes suitable for spectroscopic identification. This can include dyes readily detectable using fluorescence spectroscopy, ultraviolet-visible (UV-VIS) spectroscopy, and/or other spectroscopic techniques. Radioactive isotopes are another example of a directly detectable substance. Cobalt-60 is an example of a readily detectable radioactive isotope suitable for use in various hydroprocessing or other fixed bed reaction environments. An example of the content for a temperature-sensor particle for an indirectly detectable substance can be a catalyst particle catalyzing formation of a detectable substance within the reaction environment.

The type (or types) of detection methods used for detection of the detectable substance can be selected based on the nature of the detectable substance. Suitable types of detection methods can include, but are not limited to, electromagnetic spectrometers (e.g., fluorescence spectrometers, UV-VIS spectrometers, FTIR spectrometers), radiation detectors, gas chromatographs, mass spectrometers, and/or any other convenient type of detector. Some properties can be detected substantially continuously in real time, such as refractive index and/or infrared absorption, allowing for an alarm or other indicator to be triggered when the measured property exceeds a threshold value. For other types of detection, such as gas chromatography, measurement can typically occur on a slower (typically periodic) time scale, such as once per minute. For slower types of detection, the introduction of the detectable substance into the effluent can be a method of introduction allowing for detection on longer time scales. In some aspects, detection of a detectable substance can be performed in-line on the reactor effluent. Additionally or alternatively, a slip stream/side stream can be formed from the reactor effluent and passed into the detector. Further additionally or alternatively, depending on the detection method, a portion of the reaction effluent can be withdrawn from the fluid flow and passed into the detector.

The considerations for a temperature-sensor coating can be similar to those for a temperature-sensor particle. The same types of materials can be used for the coating, as well as the same types of (directly or indirectly) detectable substances.

Fixed Bed Processing Conditions

The systems and methods described herein for detection of an abnormal or unexpected temperature in a fixed bed processing environment can be used with any convenient type of process for processing of a (mineral) petroleum-based feed, a renewable feed, a refinery feed, a chemicals feed, and/or another type of hydrocarbonaceous or hydrocarbon-like feed (such as a feed including hydrocarbon-like compounds optionally containing heteroatoms other than carbon and hydrogen). Hydrocarbon and hydrocarbon-like feeds are defined herein to include synthetically formed hydrocarbon and hydrocarbon-like feeds, such as feeds based on compounds formed using a Fischer-Tropsch type process. Petroleum-based feeds can include, but are not limited to, whole/reduced crudes, fractions of such crudes, and/or feeds derived from processing of such crudes and crude fractions.

Fixed bed reactors are defined herein to include any convenient reactor configuration including a bed of catalyst particles remaining within a reactor during processing of a catalyst. This can include trickle-bed reactors, fixed bed downflow reactors and upflow reactors, co-current and counter-current reactors, reactors operating in gas phase, liquid phase, and/or mixed phase, and combinations thereof. Optionally, the systems and methods described herein could be used to provide temperature-sensor coatings for reactors including ebullating beds of catalyst, moving beds of catalyst, slurries of catalyst and feed, and/or other types of reactor configurations where at least a portion of the catalyst from a catalyst bed can be withdrawn from a reactor during operation.

Fixed bed reactors can be suitable for performing various types of reactions on petroleum, renewable, refinery, chemical and/or other hydrocarbon-like feedstreams. Examples of suitable types of reactions can include, but are not limited to, hydroprocessing reactions, reforming reactions, oligomerization reactions (including polymerization), alkylation reactions, transalkylation reactions, dealkylation reactions, and synthesis reactions such as Fischer-Tropsch and/or aromatic synthesis.

Hydroprocessing reactions provide a convenient example of a type of reaction that can benefit from the methods described herein. Hydroprocessing as described herein can generally refer to treating or upgrading a feedstock (such as a hydrocarbonaceous feed) in the presence of a catalyst and hydrogen at elevated temperature and pressure. Hydroprocessing can particularly refer to any process carried out in the presence of hydrogen, including, but not limited to, hydroconversion, hydrocracking (which includes selective hydrocracking), hydrogenation, hydrotreating, hydrodesulfurization, hydrodenitrogenation, hydrodemetallation, hydrodearomatization, hydroisomerization, hydrodewaxing or catalytic dewaxing, hydrofinishing, and/or aromatic saturation. The hydroprocessing reaction can be carried out in a vessel or a hydroprocessing zone in which a feed can be exposed to a hydroprocessing catalyst in the presence of hydrogen. Conditions that can be specified for exposing a feed to a bed of hydroprocessing catalyst can include, but are not limited to, temperature, pressure, hydrogen flow, hydrocarbon (or hydrocarbon-like) feed flow, or combinations thereof.

Hydroprocessing can be carried out in the presence of hydrogen. A hydrogen stream can be fed/injected into a vessel or reaction/hydroprocessing zone in which the hydroprocessing catalyst is located. Hydrogen, which is contained in a hydrogen "treat gas," can be provided to the reaction zone. Treat gas, as referred to herein, can be either pure hydrogen or a hydrogen-containing gas, which is a gas stream containing hydrogen in an amount sufficient for the intended reaction(s), optionally including one or more other gases (e.g., nitrogen and light hydrocarbons such as methane), and which should not adversely interfere with or affect either the reactions or the products. Impurities, such as $H_2S$ and $NH_3$, may be undesirable and can be at least partially removed from the treat gas before being conducted to the reactor. The treat gas stream introduced into a reaction stage can advantageously contain at least about 50 vol % or at least about 75 vol % hydrogen.

During fixed bed hydroprocessing, hydrogen can be supplied at a rate of from about 50 SCF/B (standard cubic feet of hydrogen per barrel of total feed) (~5-10 $Sm^3/m^3$) to about 50000 SCF/B (~9000-10000 $Sm^3/m^3$). Hydrogen can be supplied co-currently with the hydrocarbon (or hydrocarbon-like) feed, counter-currently, or separately via a separate gas conduit to the hydroprocessing zone. The contact of the feed with the hydroprocessing catalyst and the hydrogen can produce a total product including a liquid hydroprocessed effluent, a gaseous hydroprocessed effluent, or a combination thereof.

With regard to other fixed bed hydroprocessing conditions, the temperature in the contacting zone (e.g., the average catalyst bed temperature) can be about 300° F. (~149° C.) to about 1000° F. (~538° C.), depending on the nature of the hydroprocessing. Total pressure in the contacting zone can range from about 50 psig (~350 kPag) to about 3000 psig (~21 MPag) or more. The hydrogen partial pressure during hydroprocessing can be from about 50 psia (~350 kPaa) to about 3000 psia (~21 MPaa). Liquid hourly space velocity (LHSV) of the feed relative to the catalyst can generally range from about 0.01 to about 30 $h^{-1}$, for example from about 0.05 $h^{-1}$ to about 30 $h^{-1}$, from about 0.05 $h^{-1}$ to about 20 $h^{-1}$, from about 0.05 $h^{-1}$ to about 10 $h^{-1}$, from about 0.1 $h^{-1}$ to about 20 $h^{-1}$, or from about 0.1 to about 10 $h^{-1}$.

Depending on the aspect, the threshold temperature for a temperature-sensor structure can be at least about 20° C. greater than the average catalyst bed temperature when an abnormal temperature event occurs, for example at least about 30° C. greater, at least about 40° C. greater, or at least about 50° C. greater. Additionally or alternately, the threshold temperature for a temperature-sensor structure (such as a particle or coating) can be selected based on a temperature associated with and/or characteristic of the reactor vessel. For example, many types of reactor vessels can have a design window of suitable operating temperatures. The threshold for a temperature-sensor structure can be selected to be at least about 20° C. lower than the maximum design operating temperature, for example at least about 30° C. lower.

A reactor can contain any convenient number of fixed beds of catalysts. Some common reaction configurations can include 1 to 5 catalyst beds containing catalyst particles, but larger numbers of catalyst beds can also be suitable.

Any convenient type of hydroprocessing catalyst can be used. This can include bulk catalysts and supported catalysts, and/or bound catalysts and binderless catalysts. Some types of hydroprocessing catalysts can include molecular sieves and/or other acidic or basic catalysts that facilitate a variety of types of reactions. The relative selectivity of a catalyst that can catalyze multiple types of reactions can be dependent on the temperature in the reaction environment. Detection of an abnormal temperature can be useful for fixed bed processing using such hydroprocessing catalysts, so that unexpected increases in temperature can be identified in a controlled manner.

In some aspects, at least one catalyst in a reactor containing a fixed bed of catalyst can include a molecular sieve, such as a catalyst that includes a zeolite. Optionally, a catalyst including a zeolite and/or another type of molecular sieve can further include one or more supported metals from Groups 6-14 of the IUPAC periodic table. Examples of suitable metals can include noble metals such as Pt, Pd; other Group 6 and Group 8-10 metals, and combinations thereof. Depending on the nature of the molecular sieve, catalysts comprising molecular sieves can be used for a variety of hydroprocessing reactions, such as hydrocracking, catalytic dewaxing, and aromatic saturation. Depending on the nature of the molecular sieve, catalysts comprising molecular sieves can further be suitable for other types of reactions, such as alkylation, transalkylation, dealkylation, oligomerization, and/or aromatics formation. The molecular sieves can correspond to zeolites (silicoaluminates), or the framework of the molecular sieve can include heteroatoms different from silicon and aluminum, or the framework of the molecular sieve can be substantially composed of atoms other than silicon and aluminum. Examples of suitable molecular sieves can include, but are not limited to, molecular sieves having a 10-member ring or 12-member ring pore size as the largest pore channel size of the molecular sieve. Examples of molecular sieve frameworks having a 10-member ring or 12-member ring pore channel as the largest pore channel include *MRE, MTT, EUO, AEL, AFO, SFF, STF, MFI, FAU (including zeolite X and Y), EMT, TON, OSI, ATO, GON, MTW, SFE, SSY, MWW, MOR, *BEA, CON, MSE, ISV, IWR, IWV, and/or VET. Other examples of non-zeolitic molecular sieves can include, but are not limited to, molecular sieves having the M41S framework.

More generally, a variety of chemical conversion processes can be performed in a fixed bed reactor environment. For each of the exemplary processes listed below, the fixed bed processing conditions for operation of a fixed bed reactor when performing the corresponding process are provided. Examples of chemical conversion processes that can be performed under fixed bed processing conditions in a fixed bed reactor can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of an average catalyst bed temperature from about 10° C. to about 250° C., a pressure from about 0 psig to about 500 psig (about 3.5 MPag), a total weight hourly space velocity (WHSV) from about 0.5 $hr^{-1}$ to about 100 $hr^{-1}$, and an aromatic/olefin mole ratio from about 0.1 to about 50;

(b) alkylation of aromatics with long chain ($C_{10}$-$C_{20}$) olefins, in the gas or liquid phase, with reaction conditions optionally including one or more of an average catalyst bed temperature from about 250° C. to about 500° C., a pressure from about 0 psig to 500 psig (about 3.5 MPag), a total WHSV from about 0.5 $hr^{-1}$ to about 50 $hr^{-1}$, and an aromatic/olefin mole ratio from about 1 to about 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of an average catalyst bed temperature from about 100° C. to about 500° C., a pressure from about 1 psig (about 7 kPag) to about 500 psig (about 3.5 MPag), and a WHSV from about 1 $hr^{-1}$ to about 10,000 $hr^{-1}$;

(d) disproportionation of alkylaromatics, e.g., disproportionation of toluene to produce xylenes, with reaction conditions optionally including one or more of an average catalyst bed temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen/hydrocarbon mole ratio from 0 (no added hydrogen) to about 50;

(e) dealkylation of alkylaromatics, e.g., deethylation of ethylbenzene, with reaction conditions optionally including one or more of an average catalyst bed temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen to hydrocarbon mole ratio from 0 (no added hydrogen) to about 50;

(f) isomerization of alkylaromatics, such as xylenes, with reaction conditions optionally including one or more of an average catalyst bed temperature from about 200° C. to about 540° C., a pressure from about 100 kPaa to about 7 MPaa, a WHSV from about 0.1 $hr^{-1}$ to about 50 $hr^{-1}$, and a hydrogen/hydrocarbon mole ratio from 0 (no added hydrogen) to about 10;

(g) reaction of paraffins with aromatics, e.g., to form alkylaromatics and light gases, with reaction conditions optionally including one or more of an average catalyst bed temperature from about 260° C. to about 375° C., a pressure from about 0 psig to about 1000 psig (about 6.9 MPag), a WHSV from about 0.5 $hr^{-1}$ to about 10 $hr^{-1}$, and a hydrogen/hydrocarbon mole ratio from 0 (no added hydrogen) to about 10;

(h) paraffin isomerization to provide branched paraffins with reaction conditions optionally including one or more of an average catalyst bed temperature from about 200° C. to about 315° C., a pressure from about 100 psig (about 690 kPag) to about 1000 psig (about 6.9 MPag), a WHSV from about 0.5 $hr^{-1}$ to about 10 $hr^{-1}$, and a hydrogen to hydrocarbon mole ratio from about 0.5 to about 10;

(i) alkylation of iso-paraffins, such as isobutane, with olefins, with reaction conditions optionally including one or more of an average catalyst bed temperature from about −20° C. to about 350° C., a pressure from about 0 psig to about 700 psig (about 4.9 MPag), and a total olefin WHSV from about 0.02 $hr^{-1}$ to about 10 $hr^{-1}$;

(j) dewaxing of paraffinic feeds with reaction conditions optionally including one or more of an average catalyst bed temperature from about 200° C. to about 450° C., a pressure from about 0 psig to about 1000 psig (about 6.9 MPag), a WHSV from about 0.2 hr$^{-1}$ to about 10 hr$^{-1}$, and a hydrogen/hydrocarbon mole ratio from about 0.5 to about 10;

(k) cracking of hydrocarbons with reaction conditions optionally including one or more of an average catalyst bed temperature from about 300° C. to about 700° C., a pressure from about 0.1 atm (about 10 kPag) to about 30 atm (about 3 MPag), and a WHSV from about 0.1 hr$^{-1}$ to about 20 hr$^{-1}$; and/or (l) isomerization of olefins with reaction conditions optionally including one or more of an average catalyst bed temperature from about 250° C. to about 750° C., an olefin partial pressure from about 30 kPa to about 300 kPa, and a WHSV from about 0.5 hr$^{-1}$ to about 500 hr$^{-1}$.

Examples of System Configurations

Figure 1:
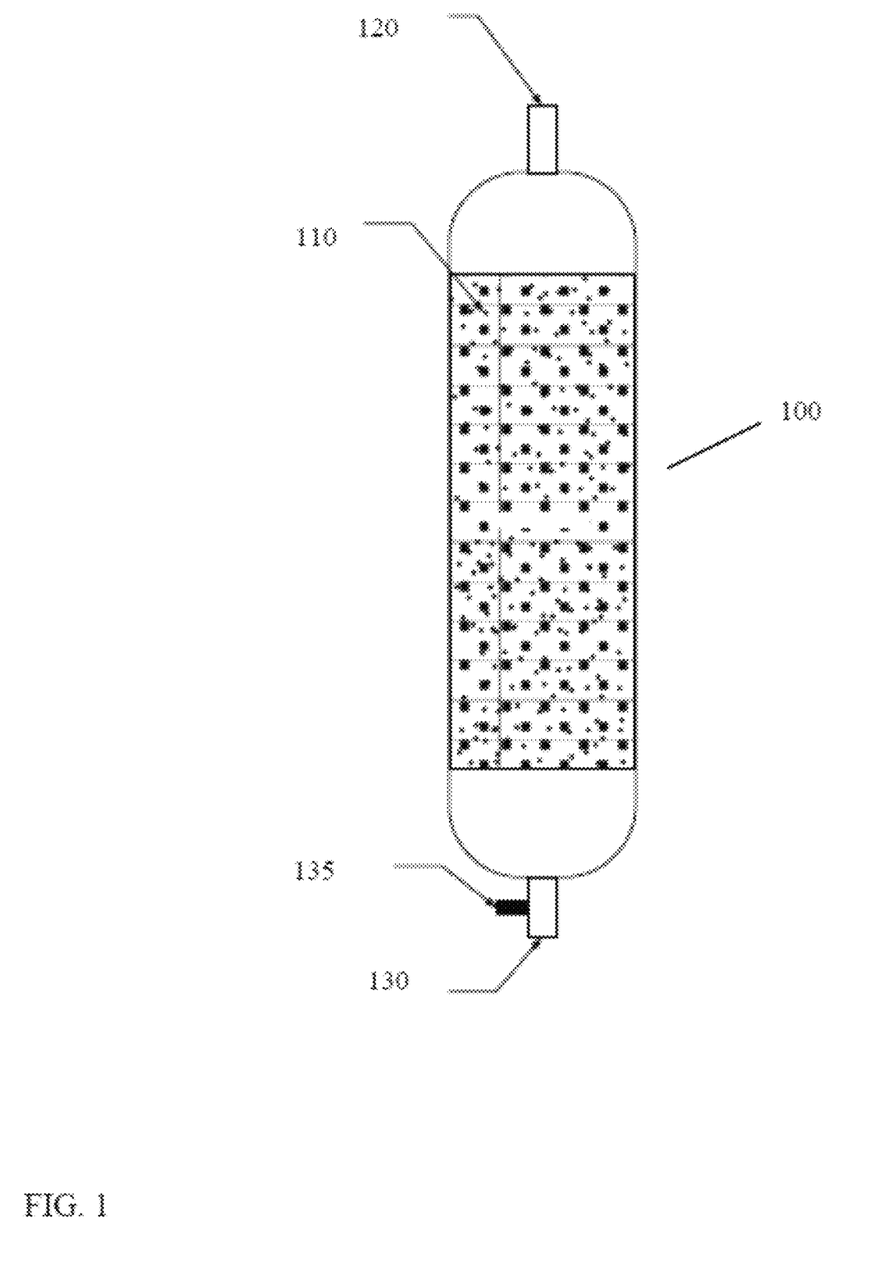
FIG. 1 schematically shows an example of a fixed bed reactor suitable for use with temperature-sensor structures as described herein.

FIG. 1 schematically shows an example of a reactor 100 containing a fixed bed including both catalyst particles and temperature-sensor particles. In FIG. 1, reactor 100 can include a catalyst bed 110 shown as containing particles, which can represent both catalyst particles and temperature-sensor particles. The catalyst particles can be loaded into catalyst bed 110 in any convenient manner. One option for loading temperature-sensor particles can be to distribute the temperature-sensor particles throughout the bed. This can correspond to a random distribution; a distribution corresponding to a pattern, such as distribution according to a grid pattern or radial pattern; a random distribution along one axis while following a pattern along a second axis; or distribution in selected areas of a catalyst bed, such as preferentially distributing the catalyst near the walls of the reactor and/or near other structural features of the catalyst bed.

The reactor depicted in FIG. 1 can correspond to a down-flow fixed bed and/or trickle bed reactor. During operation, a feed (or multiple feeds) can be introduced into reactor 100 using one or more reactor inlets 120. Optionally, additional reactor inlets 120 can be used to introduce treat gases (such as hydrogen) into the reactor 100, or treat gases can be introduced using the same inlet(s) as the feed. The feedstock can contact the catalyst in catalyst bed 110, and the resulting effluent can exit from one (or more) reactor outlet(s) 130. A detector 135 can directly monitor the flow in a single or primary reactor outlet 130, or alternatively detector 135 can be located to monitor a portion of a reactor outlet 130 corresponding to a side stream or slip stream of the primary outlet flow. In other aspects, reactor inlet(s) 110 and outlet(s) 130 can be provided to allow for other convenient modes of operation, such as upflow, co-current, and/or counter-current operation.

Figure 2:
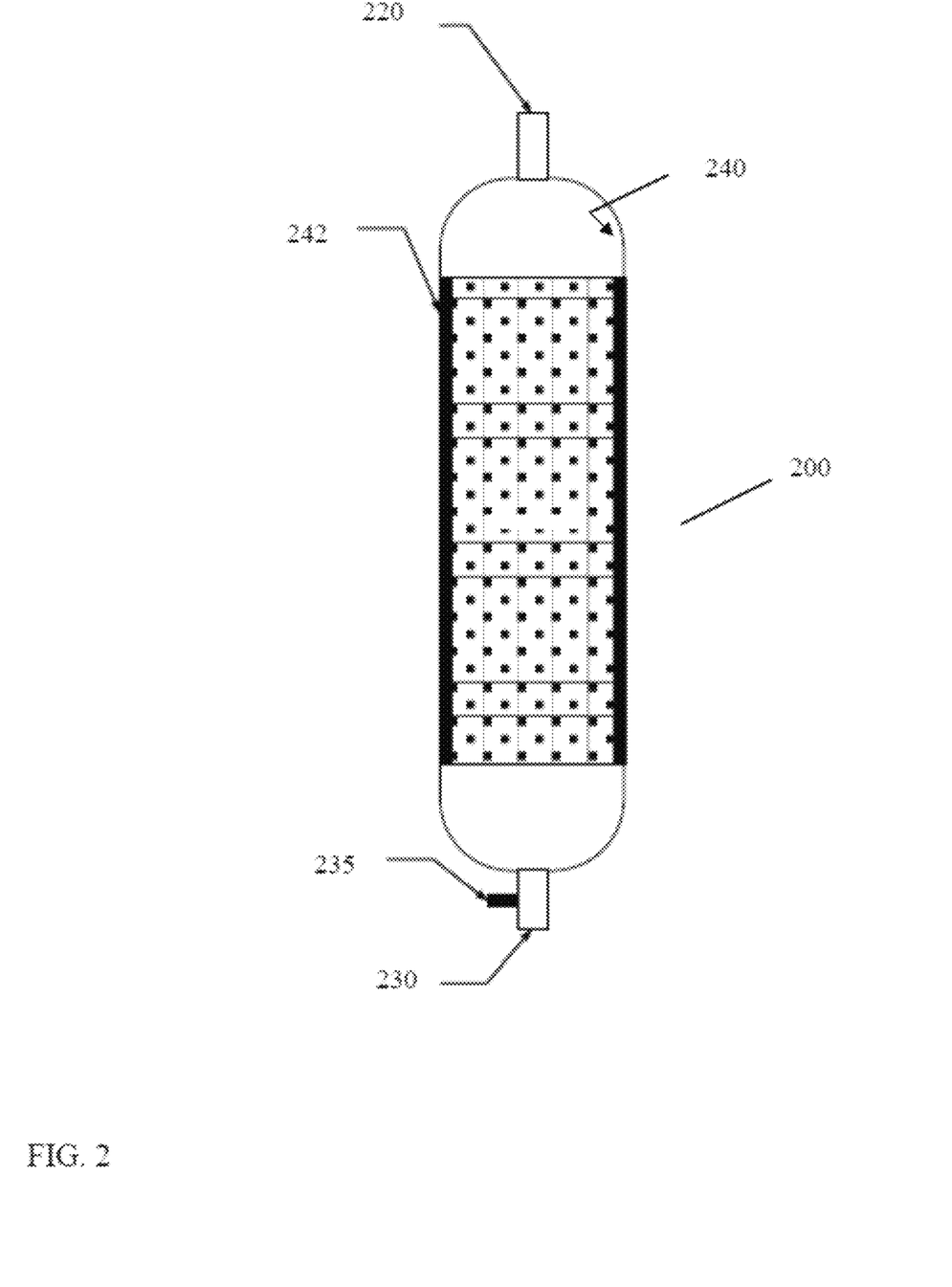
FIG. 2 schematically shows another example of a fixed bed reactor with temperature-sensor structure corresponding to a coating on an interior wall of the reactor.

FIG. 2 schematically shows another example of a reactor 200 with a temperature-sensor coating for detection of abnormal temperature events. In FIG. 2, a coating 242 can be located on at least portions of interior wall 240 of reactor 200. The locations of coating 242 on the interior wall 240 of reactor 200 can correspond to any convenient design. For example, the coating 242 can correspond to the entire surface of interior walls 240 for the entire depth of catalyst bed 210, or even beyond the extent of catalyst bed 210. Alternatively, coating 242 can be applied as a series of coating strips on interior wall 240, such as coating strips spaced in a regular pattern around the interior wall 240. Alternatively, coating 242 can be located on less than the full depth of the catalyst bed, in continuous horizontal strips around the interior wall 240, in vertical strips that have a depth less than the catalyst bed, and/or in any other convenient pattern. Similar to FIG. 1, the reactor configuration shown in FIG. 2 can correspond to a downflow configuration, where a feed (and/or multiple feeds and/or treat gas) can be introduced into reactor 200 using reactor inlet(s) 220, while the effluent formed by contacting the feed with the catalyst in catalyst bed 210 can exit reactor 200 using reactor outlet(s) 230. Also similar to FIG. 1, detector 235 can be located at reactor outlet 230 for detection of the detectable substance.

Figure 3:
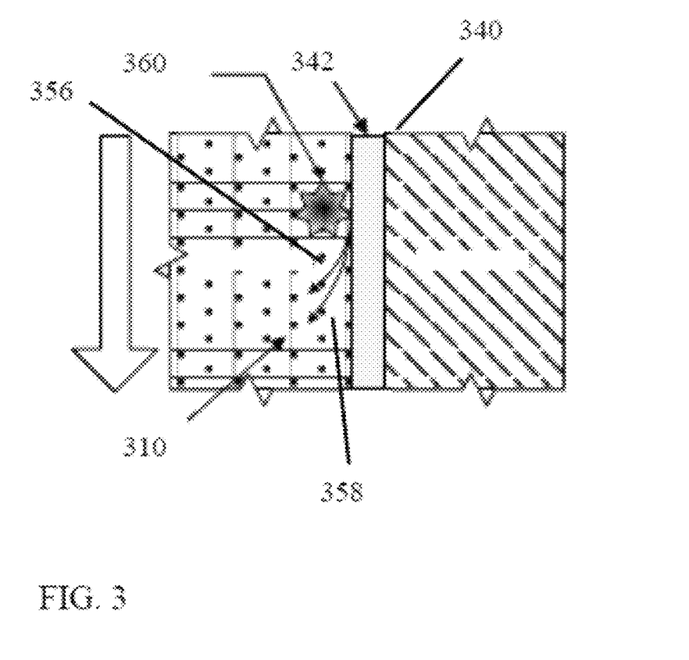
FIG. 3 schematically shows an example of a temperature-sensor coating on an interior wall of a reactor.

When a temperature-sensor structure is provided as a coating on the interior wall 340 within a reactor, at least two types of configurations can be used. FIG. 3 shows a coating configuration where the coating 342 can be the temperature-sensor structure. The arrow in FIG. 3 indicates the direction of flow of effluent relative to the reactor wall. In this type of aspect, the coating 342 can undergo a structural change when a threshold temperature is exceeded (i.e., an abnormal temperature) in proximity to the coating, such as at a hot spot 360. In this type of configuration, the material 356 of the coating 342 can correspond to the detectable substance, either directly or indirectly, or a dye 358 (or another detectable substance) can be mixed with the coating 342 and/or trapped behind the coating 342, so that the dye 358 can be introduced into the effluent in catalyst bed 310 when an abnormal temperature event occurs.

Figure 4:
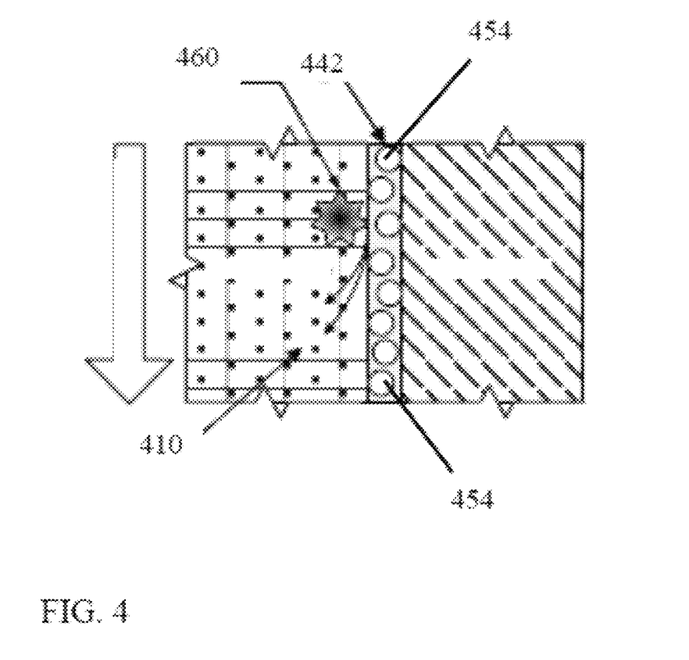
FIG. 4 schematically shows an example of a coating that contains temperature-sensor particles on an interior wall of a reactor.

FIG. 4 shows an alternative configuration where the coating 442 can provide support for maintaining the position of temperature-sensor particles 454 within the coating 442. In this type of configuration, a temperature-sensor particle 454 can undergo a structural change when exposed to an abnormal temperature. In such a configuration, the coating 442 supporting the particles 454 may not undergo a structural change, so that only the temperature-sensor particles 454 can have a structural change when exposed to the abnormal temperature. Similar to the configuration in FIG. 3, the presence of an abnormal temperature, such as due to hot spot 460, can allow a detectable substance to be released into the effluent in catalyst bed 410.

Use of Multiple Temperature-Sensor Materials with Different Temperature Thresholds In some aspects, more than one type of temperature sensor structure can be used for detection of abnormal temperature events. The different types of temperature-sensor structures can be selected in order to provide additional information regarding the nature of an abnormal temperature event.

One option can be to use a plurality of temperature-sensor structures containing different (directly or indirectly) detectable substances. This can be useful for providing additional information regarding the location of an abnormal temperature event. For example, the volume of a catalyst bed can be divided into an arbitrary number of regions. The temperature-sensor particles introduced into a given region can be selected based on the nature of the detectable substance introduced into the reactor effluent by the particle. When an abnormal temperature event occurs, the region of the catalyst bed where the abnormal temperature occurred can be identified based on the detectable substance that was detected at the reactor outlet. As another variation, one type of detectable substance can be used for a temperature-sensor coating while another type of detectable substance can be used for temperature-sensor particles distributed in the catalyst bed. This can provide information regarding whether an abnormal temperature event occurred near a reactor wall versus an interior portion of a catalyst bed.

Still other convenient combinations of using multiple temperature-sensor structures with different detectable substances can additionally or alternatively be used. As another example, temperature-sensor structures with different threshold temperatures can be introduced into a catalyst bed and/or placed in a coating. In this type of example, when an abnormal temperature occurs, there can be a period of time where the abnormal temperature can exceed a first temperature threshold but can be lower than a second temperature threshold. The resulting detectable substance introduced into the reactor effluent can allow the operator to identify a range for the abnormal temperature in the reactor. If the temperature continues to increase, a second (or possibly more) temperature threshold(s) can be exceeded, resulting in release of additional detectable substances. Having temperature-sensor structures with multiple thresholds can provide information, for example, regarding the severity of an abnormal temperature event. If multiple temperature thresholds are exceeded during a relatively short period of time, this may indicate a more serious event requiring a greater response, such as entirely shutting down a reactor versus simply reducing a flow rate of feed into a reactor.

Additional Embodiments

Embodiment 1

A method for processing a feed in a fixed bed reactor, comprising: exposing a hydrocarbon-like feed to a catalyst in a fixed catalyst bed in a reactor under fixed bed processing conditions to form a reactor effluent, the fixed bed processing conditions comprising an average catalyst bed temperature for the fixed catalyst bed, the reactor further comprising one or more temperature-sensor structures, the one or more temperature-sensor structures having a threshold temperature; and detecting a detectable substance in the reactor effluent, the detectable substance being introduced into the reactor effluent by at least one of the one or more temperature-sensor structures, wherein: a) when the detectable substance is detectable prior to exposing a temperature-sensor structure to the threshold temperature, the amount of detectable substance detected in the reactor effluent is at least about 1% greater (for example at least about 2% greater, at least about 5% greater, at least about 10% greater, or at least about 100% greater) than an average amount detected in the reactor effluent at the average catalyst bed temperature; or b) when the detectable substance is not detectable prior to exposing a temperature-sensor structure to a threshold temperature, the amount of detectable substance in the reactor effluent is greater than the detection limit for the detectable substance.

Embodiment 2

A fixed bed processing system, comprising: a reactor vessel having a reactor inlet and a reactor outlet; at least one fixed bed of catalyst particles within the reactor vessel; one or more temperature-sensor structures within the reactor vessel; a detector in fluid communication with the reactor outlet, the detector optionally comprising a spectroscopic detector, a radiation detector, a chromatographic detector, or a combination thereof, wherein the one or more temperature-sensor structures are composed of a material that undergoes a structural change at a threshold temperature, and wherein the one or more temperature-sensor structures have a first rate of introducing a detectable substance into the reactor at a temperature below the threshold temperature and a second rate of introducing the detectable substance at a temperature above the threshold temperature, the second introduction rate being at least about 5 times (e.g., at least about 10 times, at least about 25 times, at least about 100 times, or at least about 1000 times) the first introduction rate.

Embodiment 3

The method of Embodiment 1, wherein the amount of detectable substance detected in the reactor effluent is at least about 10 times greater (for example at least about 25 times greater, at least about 100 times greater, or at least about 1000 times greater) than the average amount detected at the average catalyst bed temperature.

Embodiment 4

The method of Embodiment 1 or 3, wherein the one or more temperature-sensor structures have a first rate of introducing the detectable substance into the reactor at a temperature below the threshold temperature and a second rate of introducing the detectable substance at a temperature above the threshold temperature, the second introduction rate being at least about 5 times the first introduction rate.

Embodiment 5

The method of any of Embodiments 1 and 3-4, wherein the average bed temperature is at least about 20° C. lower than the threshold temperature, or at least about 30° C. lower, or at least about 40° C. lower.

Embodiment 6

The method of any of embodiments 1 and 3-5, wherein the hydrocarbon-like feed comprises a petroleum feed, a renewable feed, a refinery feed, a chemicals feed, or a combination thereof.

Embodiment 7

The system or method of any of the above Embodiments, wherein the one or more temperature-sensor structures are composed of a material, the detectable substance being directly or indirectly formed from the material.

Embodiment 8

The system or method of any of the above Embodiments, wherein the one or more temperature-sensor structures comprise temperature-sensor particles, the temperature-sensor particles optionally having a diameter that is about 0.25 times to about 4 times the diameter of an average catalyst particle diameter in the catalyst bed.

Embodiment 9

The system or method of Embodiment 8, wherein the temperature-sensor particles are distributed randomly in the catalyst bed, wherein the temperature-sensor particles further comprise a catalyst, or a combination thereof.

Embodiment 10

The system or method of any of Embodiments 1-7, wherein at least a portion of the temperature-sensor structures are distributed randomly in the catalyst bed, wherein at least a portion of the temperature-sensor structures further comprise a catalyst, or a combination thereof.

Embodiment 11

The system or method of any of the above Embodiments, wherein the one or more temperature-sensor structures comprise at least a first temperature-sensor structure having a first threshold temperature and a second temperature-sensor structure having a second threshold temperature.

Embodiment 12

The system or method of any of the above Embodiments, wherein a first temperature-sensor structure introduces a first detectable substance into the reactor, a second temperature-sensor structure introduces a second detectable substance into the reactor, and the first detectable substance is different from the second detectable substance.

Embodiment 13

The system or method of any of the above Embodiments, wherein the reactor comprises a coating on an interior surface, the coating a) being at least one of the one or more temperature-sensor structures; b) comprising one or more temperature-sensor particles; or c) a combination thereof.

Embodiment 14

The system or method of any of the above Embodiments, wherein the detectable substance is an indirectly detectable substance.

Embodiment 15

The method of any of Embodiments 1 and 3-14, wherein, when the detectable substance is not detectable prior to exposing a temperature-sensor structure to a threshold temperature, the amount of detectable substance detected in the reactor effluent is about 1 ppb to about 1000 ppm by weight.

Embodiment 16

The method of any of Embodiments 1 and 3-15, wherein the fixed bed processing conditions comprise fixed bed hydroprocessing conditions, which optionally comprise a treat gas rate from about 50 SCF/B (~5-10 Sm$^3$/m$^3$) to about 50000 SCF/B (~9000-10000 Sm$^3$/m$^3$), an average catalyst bed temperature from about 300° F. (~149° C.) to about 1000° F. (~538° C.), a total pressure from about 50 psig (~350 kPag) to about 3000 psig (~21 MPag), a hydrogen partial pressure from about 50 psia (~350 kPaa) to about 3000 psia (~21 MPaa), and a liquid hourly space velocity (LHSV) of the feed relative to the catalyst from about 0.01 h$^{-1}$ to about 30 h$^{-1}$.

EXAMPLE

Application of Inventive Concept to Hydroprocessing for Lubricant Base Stock Production Catalytic methods for formation of lubricant base stocks often involve exposing a feed having a boiling range of about 650° F. (~343° C.) to about 1050° F. (~566° C.) to a series of catalysts under selected hydroprocessing conditions. Exposing the feed and/or the resulting intermediate effluents to the catalysts can be conveniently performed using fixed catalyst beds.

As shown below, fixed bed hydrocracking conditions can often involve catalyst bed temperatures of about 300° C. to about 450° C. Catalytic dewaxing can involve catalyst bed temperatures of about 250° C. to about 430° C. The specific temperature ranges can depend on the nature of the feed and the nature of the catalyst. While hydrocracking and dewaxing reactions can be well-controlled in the desired temperature ranges, exposing a feed to a hydrocracking and/or dewaxing catalyst at higher temperatures can potentially lead to undesirable increases in activity for alternative reaction pathways and/or undesirable increases in cracking activity. This can result in localized heating and temperature increases in a catalyst bed, leading to still higher reaction rates and further heating and temperature increases. The temperature-sensor structures described herein can be used to detect temperatures above a desired or target temperature range within a catalyst bed. Based on the temperatures of operation for hydrocracking and catalytic dewaxing, suitable choices of a material for a temperature-sensor particle or coating can be zinc (melting point ~420° C.) or magnesium alloys (melting point ~349° C.-649° C.). When a temperature-sensor particle or coating made from zinc or a magnesium alloy melts, a substance contained within the particle or coating can be introduced into the reactor effluent and detected.

One type of catalytic processing during lubricant base stock production can be hydrocracking. During lubricant base stock production, hydrocracking can be used for removal of heteroatom contaminants and/or for producing an upgraded effluent with an improved viscosity index.

Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophophates. One example of suitable zeolite is USY, such as a USY zeolite with cell size of ~24.30 Angstroms or less. Additionally or alternately, the catalyst can be a low acidity molecular sieve, such as a USY zeolite with a Si to Al ratio of at least about 20, and preferably at least about 40 or at least about 50. ZSM-48, such as ZSM-48 with a SiO$_2$ to Al$_2$O$_3$ ratio of about 110 or less (such as about 100 or less, about 90 or less, from about 40 to about 100, or from about 40 to about 90) is another example of a potentially suitable hydrocracking catalyst. Still another option is to use a combination of USY and ZSM-48. Still other options include using one or more of zeolite Beta, ZSM-5, ZSM-35, or ZSM-23, either alone or in combination with a USY catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in an embodiment).

When only one hydrogenation metal is present on a hydrocracking catalyst, the amount of that hydrogenation metal can be at least about 0.1 wt % based on the total weight of the catalyst, for example at least about 0.5 wt % or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Further additionally or alternately when more than one hydrogenation metal is present, the collective amount of hydrogenation metals can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternately when more than one hydrogenation metal is present, the collective amount of hydrogenation metals can be about 35 wt % or less based on the total weight of the catalyst, for example about 30 wt % or less, about 25 wt % or less, about 20 wt % or less, about 15 wt % or less, about 10 wt % or less, or about 5 wt % or less. In embodiments wherein the supported metal comprises a noble metal, the amount of noble metal(s) is typically less than about 2 wt %, for example less than about 1 wt %, about 0.9 wt % or less, about 0.75 wt % or less, or about 0.6 wt % or less. It is noted that hydrocracking under sour conditions is typically performed using a base metal (or metals) as the hydrogenation metal.

A hydrocracking process can be carried out at temperatures of about 550° F. (~288° C.) to about 840° F. (~449° C.), hydrogen partial pressures of from about 1500 psig to about 5000 psig (~10.3 MPag to ~34.6 MPag), liquid hourly space velocities from about 0.05 $h^{-1}$ to 10 $h^{-1}$, and hydrogen treat gas rates from about 35.6 $m^3/m^3$ to about 1781 $m^3/m^3$ (~200 SCF/B to 10000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 $m^3/m^3$ to about 1070 $m^3/m^3$ (~1200 SCF/B to ~6000 SCF/B). The LHSV can be from about 0.25 $h^{-1}$ to about 50 $h^{-1}$ or from about 0.5 $h^{-1}$ to about 20 $h^{-1}$, for example from about 1.0 $h^{-1}$ to about 4.0 $h^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator can be to simply perform a gas-liquid separation to remove contaminant. Another option can be to use a separator such as a flash separator that can perform a separation at a higher temperature. Such a high temperature separator can be used, for example, to separate the feed into a portion boiling below a temperature cut point, such as about 350° F. (~177° C.) or about 400° F. (~204° C.), and a portion boiling above the temperature cut point. In this type of separation, the naphtha boiling range portion of the effluent from the first reaction stage can be removed, thus reducing the volume of effluent processed in the second or other subsequent stages. Of course, any low boiling contaminants in the effluent from the first stage could be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least about 350° F. (~177° C.) or at least about 400° F. ~(204° C.) to having an upper end cut point temperature of about 700° F. (~371° C.) or less or about 650° F. (~343° C.) or less. Optionally, the distillate fuel range can be extended to include additional kerosene, such as by selecting a lower end cut point temperature of at least about 300° F. (~149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base stocks. In such aspects, the portion boiling above the distillate fuel range is subjected to further hydroprocessing in a second hydroprocessing stage. Optionally, the lighter lube fractions can be distilled and operated in the catalyst dewaxing sections in a blocked operation where the conditions are adjusted to maximize the yield and properties of each lube cut.

Prior to, during, and/or after exposing a feed (including an intermediate effluent) to a hydrocracking catalyst, a feed can also be exposed to a dewaxing catalyst to improve cold flow properties of the resulting product. For catalytic dewaxing, suitable dewaxing catalysts can include molecular sieves such as crystalline aluminosilicates (zeolites). In an embodiment, the molecular sieve can comprise, consist essentially of, or be ZSM-22, ZSM-23, ZSM-48. Optionally but preferably, molecular sieves that are selective for dewaxing by isomerization as opposed to cracking can be used, such as ZSM-48, ZSM-23, or a combination thereof. Additionally or alternately, the molecular sieve can comprise, consist essentially of, or be a 10-member ring 1-D molecular sieve, such as EU-2, EU-11, ZBM-30, ZSM-48, or ZSM-23. ZSM-48 is most preferred. Note that a zeolite having the ZSM-23 structure with a silica to alumina ratio of from about 20:1 to about 40:1 can sometimes be referred to as SSZ-32. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the invention are catalysts with a low ratio of silica to alumina. For example, for ZSM-48, the ratio of silica to alumina in the zeolite can be about 100:1 or less, such as about 90:1 or less, or about 75:1 or less, or about 70:1 or less. Additionally or alternately, the ratio of silica to alumina in the ZSM-48 can be at least about 50:1, such as at least about 60:1, or at least about 65:1.

In various embodiments, the catalysts according to the invention further include a metal hydrogenation component. The metal hydrogenation component is typically a Group VI and/or a Group VIII metal. Preferably, the metal hydrogenation component can be a combination of a non-noble Group VIII metal with a Group VI metal. Suitable combinations can include Ni, Co, or Fe with Mo and/or W, advantageously in some embodiments Ni with Mo and/or W.

The amount of metal in the catalyst can be at least about 0.1 wt % based on catalyst, for example at least about 0.5 wt %, at least about 1.0 wt %, at least about 2.5 wt %, or at least about 5.0 wt %, based on catalyst. Additionally or alternatively, the amount of metal in the catalyst can be 20 wt % or less based on catalyst, for example about 10 wt % or less, about 5 wt % or less, about 2.5 wt % or less, or about 1 wt % or less. For embodiments where the metal is a combination of a non-noble Group VIII metal with a Group VI metal, the combined amount of metal can be from about 0.5 wt % to about 20 wt %, for example from about 1 wt % to about 15 wt % or from about 2.5 wt % to about 10 wt %.

Fixed bed processing conditions for catalytic dewaxing of a feedstock in the presence of a dewaxing catalyst can include a temperature from about 300° C. to about 450° C., e.g., from about 343° C. to about 435° C., a hydrogen partial pressure from about 3.5 MPag to about 34.5 MPag (~500 psig to ~5000 psig), e.g., from about 4.8 MPag to about 21 MPag (~700 psig to ~3000 psig), and a hydrogen circulation rate from about 180 $m^3/m^3$ (~1000 SCF/B) to 1800 $m^3/m^3$ (~10000 SCF/B), e.g., from about 210 $m^3/m^3$ (~1200 SCF/B) to about 1100 $m^3/m^3$ (~6000 SCF/B). The LHSV can be from about 0.2 $h^{-1}$ to about 10 $h^{-1}$, such as from about 0.5 $h^{-1}$ to about 5 $h^{-1}$ or from about 1 $h^{-1}$ to about 4 $h^{-1}$.

The principles and modes of operation of this invention have been described above with reference to various exemplary and preferred embodiments. As understood by those of skill in the art, the overall invention, as defined by the claims, encompasses other preferred embodiments not specifically enumerated herein.

The invention claimed is:

1. A fixed bed processing system, comprising: a reactor vessel having a reactor inlet and a reactor outlet; at least one fixed bed of catalyst particles within the reactor vessel; one or more temperature-sensor structures within the reactor vessel; a detector in fluid communication with the reactor outlet, wherein the one or more temperature-sensor structures are composed of a material that undergoes a structural change at a threshold temperature, and wherein the one or more temperature-sensor structures have a first rate of introducing a detectable substance into the reactor at a temperature below the threshold temperature and a second rate of introducing the detectable substance at a temperature above the threshold temperature, the second introduction rate being at least about 5 times the first introduction rate.

2. The system of claim 1, wherein the one or more temperature-sensor structures comprise temperature-sensor structures, wherein the structures are suitable for acting as containers for another substance.

3. The system of claim 1, wherein the one or more temperature-sensor structures are distributed randomly within the catalyst bed.

4. The system of claim 3, wherein the temperature-sensor structures further comprise a catalyst.

5. The system of claim 1, wherein the one or more temperature-sensor structures are composed of a material, the detectable substance being directly or indirectly formed from the material, wherein indirectly forming the detectable substance comprises the temperature-sensor structure releasing a first substance that undergoes further reaction, that catalyzes a reaction, or a combination thereof so as to produce the detectable substance.

6. The system of claim 1, wherein the reactor vessel further comprises an interior wall with a coating, the coating comprising at least one of the one or more temperature-sensor structures.

7. The system of claim 6, wherein the one or more temperature-sensor structures comprise temperature-sensor structures, wherein the structures are suitable for acting as containers for another substance.

8. The system of claim 1, wherein the detector comprises a spectroscopic detector, a radiation detector, a chromatographic detector, or a combination thereof.

9. The system of claim 1, wherein the one or more temperature-sensor structures comprise at least a first temperature-sensor structure having a first threshold temperature and a second temperature-sensor structure having a second threshold temperature.

* * * * *